July 5, 1932.　　A. McL. NICOLSON　　1,866,169
STEREOVISION
Filed May 31, 1930　　3 Sheets-Sheet 1
Fig_1
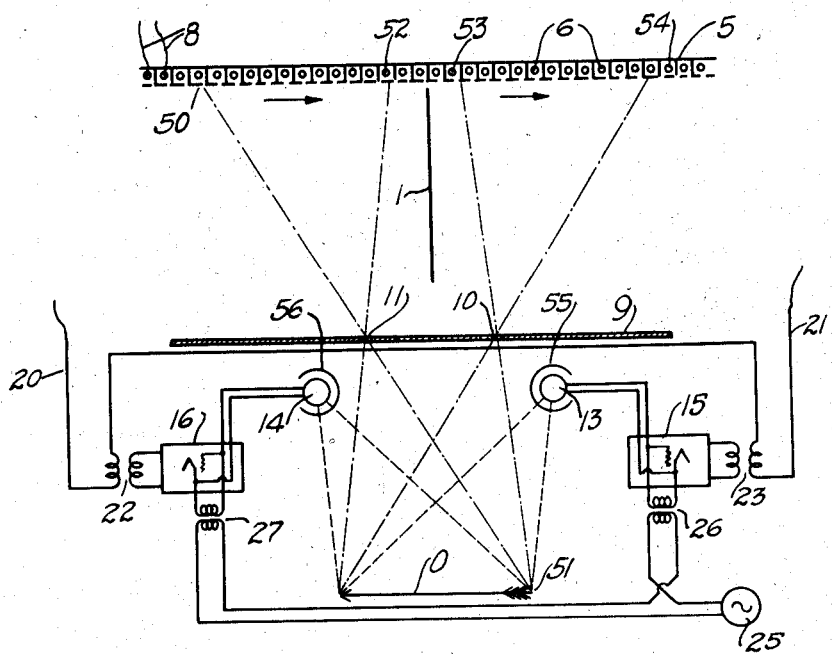
Fig_2
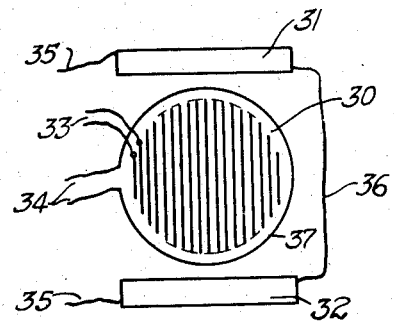
Fig_3a　Fig_3b
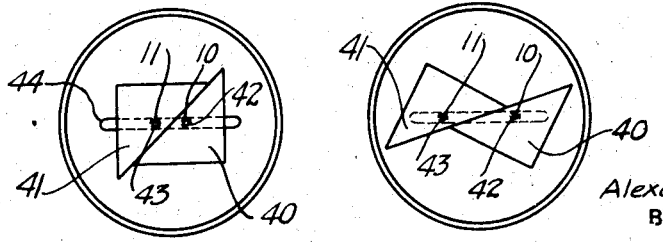
INVENTOR
Alexander McLean Nicolson.
BY
ATTORNEY

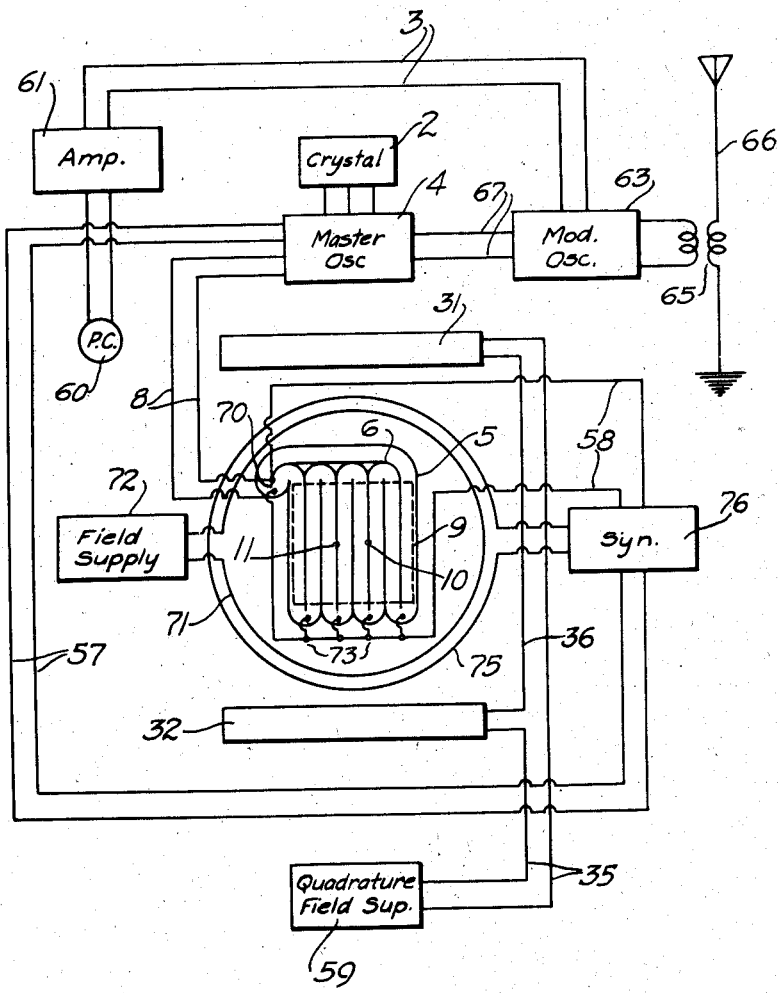

July 5, 1932.  A. McL. NICOLSON  1,866,169
STEREOVISION
Filed May 31, 1930  3 Sheets-Sheet 3
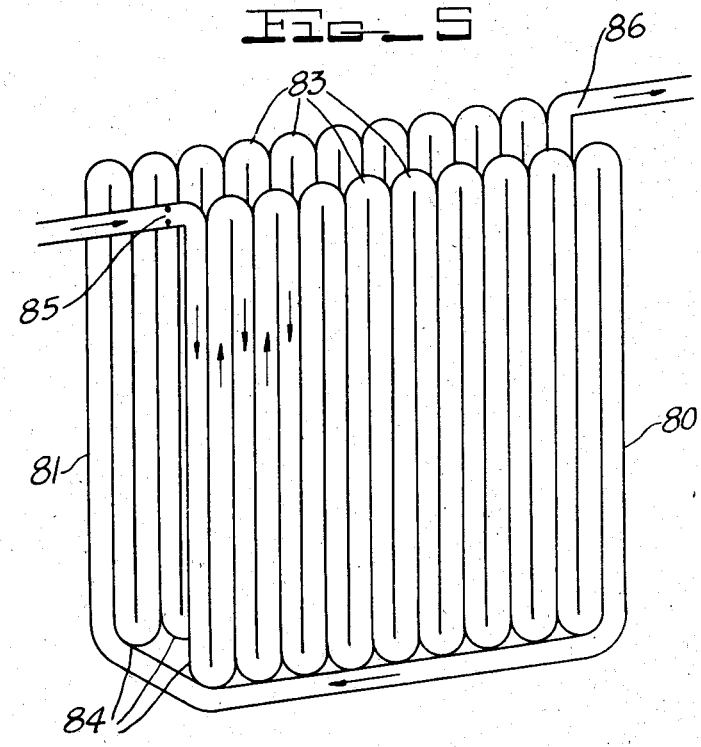
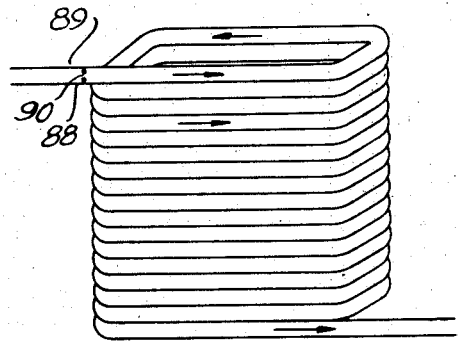
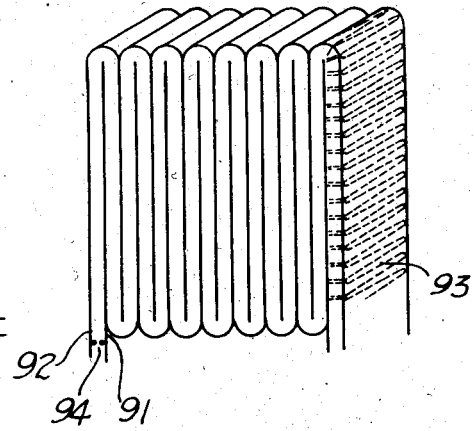
INVENTOR
Alexander McLean Nicolson.
BY
ATTORNEY Patented July 5, 1932

1,866,169

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y., A CORPORATION OF DELAWARE

STEREOVISION

Application filed May 31, 1930. Serial No. 458,745.

This invention relates to the transmission and reception of images of objects over wires or through space, and particularly to systems for the transmission and reception of images in three dimensions.

An object of this invention is to transmit and receive images in three dimensional form without the use of any mechanical moving parts.

In my copending application Serial No. 397,826, filed October 7, 1929, a television system employing the use of an electrodynamic arc in a magnetic field for scanning an object whose image is to be transmitted and the use of such an arc for reproducing the picture at the receiver has been disclosed.

The present invention contemplates the use of the general principles involved in the transmitting and receiving system of this copending application, as well as those in copending application Serial No. 450,025, filed May 5, 1930, now Patent No. 1,829,838, November 3, 1931.

A feature of the present invention is the use of a double pinhole camera, the pinholes being placed so as to be analogous to the eyes of the person viewing the object.

Another feature of the invention is the use of a single scanning screen which, in conjunction with the double pinhole camera, permits scanning an object twice for one cycle of the arc over the field, and permits the obtaining of two views side by side.

Furthermore, by the use of anterior—posterior screens, actual depth is secured without shielding any part of the screen from the view of both eyes. A single pinhole or lens camera may be employed with similar scanning and receiving screens. These screens may have back and front portions, the arc traversing the entire front portion before traversing the entire back portion, or the arc may traverse a section of the front and then a section of the back portion alternately in its propagation over the screen. Also by the action of a quadrature field, the arc may be made to oscillate between the anterior and posterior portions of the screen to provide depth to the received image.

The details of the invention will be more fully understood by reference to the accompanying drawings in which:

Figure 1 shows diagrammatically the transmitter of my invention;

Fig. 2 shows a circular form of arc screen;

Figs. 3a and 3b show means for adjusting the focus of the double pinhole camera;

Fig. 4 is a diagrammatic sketch of the circuit arrangement for the transmitting system; and Figs. 5, 6 and 7 are perspective views of three different types of depth screens.

Referring to Figure 1, a scanning screen 5 is shown in which the rail electrodes 6 of metallic rods or strips are arranged vertically instead of horizontally, as shown in my copending applications referred to above. These electrodes may be energized from conductors 8 which are connected to a master oscillator 4 (Fig. 4) for supplying the required arc potential. As Fig. 1 is a top view of a cross section of the screen, the arc travels normal to the plane of the paper. A division partion 1 extends vertically across the depth of the entire screen and forward therefrom any desired distance, preferably about six feet. A camera 9 has two pinholes 10 and 11, to permit the arc on the screen 5 to scan the object twice while passing from left to right over the screen. Photoelectric cells 13 and 14 are shown connected to amplifier systems 15 and 16, respectively. The outputs of these amplifiers are impressed on an output circuit having conductors 20 and 21 through transformers 22 and 23. Conductors 20 and 21 may be conductors 3 (Fig. 4), connected to a modulator-oscillator system for transmission of the photo cell frequencies. Amplifiers 15 and 16 are made alternately operable by employing an alternating current biasing potential supplied from an oscillator 25. The output wave of these biasing oscillations is, preferably, flat topped with substantially vertical sides in order to provide a rapid stop and start action to the amplifiers, although a sine wave may be employed. This biasing potential is fed to amplifier 15 through a transformer 26 and to amplifier 16 through a transformer 27. The transformers 26 and 27 are connected in reverse order to make the amplifiers 15 and 16 alternately operable during alternate half cycles of the frequency of the oscillator 25.

In Fig. 2 a vertical electrode screen 30 which has a circular field of view, is shown having anterior-posterior coils 31 and 32. This screen is supplied with an arc potential over conductors 33, and its field, indicated by a single turn 37, is supplied through conductors 34. The anterior-posterior coils 31 and 32, connected by conductor 36, are energized over conductors 35, in series. The purpose of coils 31 and 32 is to drive the arc toward and away from the object being scanned or toward and away from the eye, the purpose thereof to be explained hereinafter.

In Figs. 3a and 3b a simple mechanical arrangement for stereo-focusing a camera is shown. Pinholes 10 and 11 are contained in respective triangular shaped sections 40 and 41. The portions 40 and 41 are mounted on cylindrical rotating and sliding pins 42 and 43 surrounding the pinholes as indicated by the dotted lines. These cylindrical pins slide and rotate in a transverse horizontal groove 44. In Fig. 3a the blocks 40 and 41 are shown in a position where the pinholes are close together. To separate the pinholes, the blocks are rotated in a clockwise direction, a certain separated position being shown in Fig. 3b.

Fig. 4 represents diagrammatically the circuit arrangement for a transmitter embodying the invention. The vertical arc screen 5 is shown with its electrodes 6, the electrodes having a foreshortened gap 70 connected to the supply conductors 8 which in turn are fed from the master oscillator 4. The frequency of the master oscillator is maintained constant by a crystal control 2. Mounted in front of the scanning screen 5 is the camera 9 having its two pinholes 10 and 11. The magnetic driving field for the arc is illustrated by a single turn 71 energized from the field supply 72 which may be either alternating or direct current, the alternating field requiring an alternating arc potential. The control winding 75 is shown being supplied from the synchronizer 76. The synchronizer is also shown connected to the master oscillator 4 through conductors 57, and to the scanning screen through conductors 58. This synchronizer operates in exactly the same manner as disclosed and illustrated in the above mentioned copending application.

In the circuit of Fig. 4 the anterior-posterior coils 31 and 32 are shown connected in series to a field supply 59 over conductors 35 and 36 which is in quadrature with that of driving field 71. In this circuit only one photoelectric cell 60 is shown with its associate amplifier 61 but a plurality of them distributed around the periphery of the camera or screen connected in parallel or two cells arranged as shown in the circuit of Fig. 1, which have been screened or are alternately controllable may be employed. The amplified photoelectric currents are impressed upon a modulator-oscillator 63 over conductors 3. After modulation with a carrier frequency, these currents are transmitted through a transformer 65 to an antenna system 66 for transmission through space. This space transmission equipment may be replaced by a wire system in the well known manner. Along with the transmission of the photoelectric cell currents which represent light and shade intensities of an object there is also transmitted simultaneously therewith, the piloting and synchronizing impulses, together with the basic arc frequency, if an alternating current system is employed. The master oscillator is connected to the modulator-oscillator by conductors 67.

In Fig. 5, a screen having an anterior portion 80 and a posterior portion 81 is composed of vertical rail electrodes 83 and 84 which are continuous from a foreshortened gap 85 to the exit 86. The arc is propagated in the direction of the arrows, and traverses the front portion 80 from left to right, and then the rear portion 81 from left to right. The rails are of rods or metallic strips having a small cross sectional area to permit the arc being seen when traveling over the posterior rails and to permit scanning by the arc of the object when the arc is propagated over the posterior section 80.

Fig. 6 shows a coil screen in which electrode rails 88 and 89 are formed to cause the arc to scan a line unit of a scene from two different angles. The arc travels so as to scan a line unit from left to right, and then travels to the posterior position and scans a line section from right to left, starting from the foreshortened gap 90. The arc, therefore, scans the entire object in two positions but in line units distinguishing from the screen of Fig. 5, which scans the entire object in one position before the second scanning from a different angle.

The screen in Fig. 7 also permits the arc to scan an object from different angles by the use of wide electrode rails 91 and 92. These rails have sufficient width so that the arc may be driven backward and forward therebetween by a field in quadrature with the main propagation field. The arc will, therefore, follow the path as shown by the dotted line 93 on the side of one of the electrodes. In other words, the arc follows an oscillating path and may be referred to as an oscillating arc. The oscillating arc is initiated at the foreshortened gap 94 and proceeds across the screen from left to right in vertical line units and along the rails as illustrated by the path 93, thus scanning the object from an infinite number of points or angles between the limits of the front portion of the screen and the rear portion thereof.

Any of the types of screens disclosed in Figs. 5, 6 and 7 may be used at any angle between the horizontal or vertical positions, as long as the transmitter and receiver screens of the same system have the same relative positions. Furthermore, by the use of screens of this type, a single pinhole camera is all that is required, the actual transmission of the arc from front to back providing the depth effect to the scene. These screens may be enclosed in vacuum or gas filled transparent envelopes, or the electrodes may be exposed to the open air.

The system of Fig. 4 operates on the same basic principles as described in my copending application, and is substantially a replica thereof except for the vertical scanning screen arrangement of the electrodes. This system employs a simple electrode rail screen, and will be described first. After an arc is initiated at the foreshortened gap 70, it is propagated over the screen system in vertical lines from left to right. The arc is made to progress over the screen at a constant uniform speed by synchronizer 56, which weakens or strengthens the driving field in accordance with the lead or lag of the arc at the rail shunts 73. Light from the arc is projected through the pinholes 10 and 11 alternately on the object scanned, and is reflected upon the photoelectric cell 60 or plurality thereof for transmission to a receiving system. The quadrature field coils 31 and 32 are not necessary in this method, but their use will be explained later. This system may alternate in function and be used either as a transmitter or a receiver as disclosed in application Serial No. 397,826.

In order to obtain stereoscopic effects with this system, an object is scanned in a manner which simulates the viewing thereof by the two eyes of a person. Assuming that the ibage of an object O (Fig. 1) shown in the form of an arrow, is to be transmitted to a distant receiver. The arc travels from left to right as shown by the screen arrows so that when it reaches electrode 50 it will project a ray of light on the object at point 51. As the arc is propagated vertically, it scans the object in vertical line units, the scanning of the object being complete when the arc reaches the electrode 52. When the arc reaches electrode 53, however, and progresses to electrode 54, it again scans the object from right to left. In this manner, alternate scannings of the object from two different angles are being made for transmission. These scannings are transmitted successively and imposed on a receiving screen arc of the same type producing thereon two images of the object as scanned through the two pinholes. As the division 1 permits only one image to be seen with one eye, a perfect stereoscopic effect is obtained. The principle of reception is that of the well known stereoscope.

As shown in Fig. 4 a single photoelectric cell 60 may be employed for transmitting the successive scannings of the object by the arc as it passes across the screen. Each scanning will present on the receiving screen the same object in varying light intensities in accordance with the light and shade appearing from the two different scanning angles. The scannings are reproduced sufficiently rapid to form a solid image on each portion of the receiving screen. When one photoelectric cell is used, the object must be focused so that light from the scanning arc will reach it from only one pinhole at any one instant.

Reception may either be accomplished by impressing on a traveling receiving screen arc, the photoelectric cell currents or by impressing on quadrature disposed coils such as 31 and 32 of Fig. 2, the cell currents to bow the arc anteriorly and posteriorly, providing the varying degrees of light and shade. The quadrature field coils 31 and 32 of Figs. 2 and 4 will be used in this type of reception.

Referring again to Fig. 1, two photoelectric cells 13 and 14 are shown which are alternately operable because of the alternate biasing thereof from an oscillator 25. This oscillator 25 may be part of the master oscillator 4 in Fig. 4 so as to synchronize the scanning arc with the operation of the cells or may be a separate source as shown. In the system of Fig. 1 each cell may transmit the scanning through one particular pinhole for instance cell 13 is transmitting the scanning of the object through pinhole 11, and cell 14 is transmitting the scanning of the object through pinhole 10. This arrangement has a higher efficiency than that employing one photoelectric cell, since the angle of reflected light may be made more desirable. Also by the use of two cells stereoscopic effects may be augmented by the use of color shields. For instance, photoelectric cell 13 may be responsive intrinsically or by the use of a shield, to light of one particular color while photoelectric cell 14 may be made sensitive in similar ways to light of a different color. The arc may itself project light of two different colors, the portion lying between 50 and 52 projecting red light, and the portion between 53 and 54 projecting a blue light. If, therefore, cell 14 is responsive to blue light, and cell 15 is responsive to red light, these cells may be alternately responsive to two scannings without the use of the alternating grid biasing circuit comprising the oscillator 25 and the transformers 26 and 27. This color effect may be further augmented by the use of colored shields at the pinholes 10 and 11 so that the arc may be projecting white light but only red light is transmitted through pinhole 11 for transmission by the cell 13 and blue light through pinhole 10 for transmission by the cell 14.

The receiving apparatus for this transmission system may be in general the ordinary receiver system disclosed in my copending applications mentioned above. The specific screen is as shown in Fig. 1 with the division 1, the alternate scannings being received on one particular side of the screen. By the use of the color transmitter and receiver disclosed in copending application Serial No. 450,630, filed May 8, 1930, objects may be transmitted both in their natural colors and in three dimensional appearance. With this method of transmission, stereoscopic photographs may be transmitted and received, associated views appearing on respective portions of the receiving screen.

Referring now to the screens shown in Figs. 5, 6 and 7 which are used in the method of transmitting and receiving three dimensional images about to be described, it will be observed that two screens are effectively combined into one transmitting and receiving screen unit. The screen in Fig. 5 may be used with the transmission system shown in Fig. 4, with the arc produced in the same manner and propagated similarly. The arc, however, will scan an object from its position on the front part of the screen and immediately thereafter from its position on the back portion of the screen. This scanning is accomplished through a single pinhole and, therefore, a unit area of the object will be scanned with light projecting from two different angles. When this light is transformed into electrical vibrations and transmitted to a receiving screen of similar configuration, and super-imposed upon a like traveling arc, the scannings of the object obtained from the two angles will be reproduced as images on like portions and positions of the receiver screen. Since actual depth is provided by the screen and will be observed by the two eyes of the observer, it will be unnecessary to obscure one view from one eye alternately as in the case with the system just described. Furthermore, the system requires the use of only one pinhole, the actual displacement of the arc itself at the transmitter and at the receiver, producing actual depth conception to the observer.

The screen of Fig. 6 may also be used in the transmission system of Fig. 4, the operation being identical except for the configuration of the scanning arc. The arc will obtain its different angles of projection by its travel to the back portion of the screen, but it will do so in line units instead of complete scannings as with the screen of Fig. 5. The rails themselves are of small cross section, so that practically no obstruction to the scanning function of the arc or obstruction to the observer's view is caused by the front electrodes as the arc traverses the rear electrodes. In either screen the arc is traveling at a sufficient rate of speed to make a solid appearance to the observer.

The screen of Fig. 7 requires use of quadrature coils such as shown in Fig. 4, at 31 and 32 with their energy supply 59. The action of this field along with the main propagation field produces the plural angle scanning desired. The arc actually travels from left to right over the screen in scanning the object, but traverses the rails from front to back in accordance with the diagram shown at 93. In its oscillating travel it scans minute increments of the object at various angles, the reception thereof upon a similar oscillating receiving arc produces the actual depth conception to the observer. With such a screen more detail may be observed, since a more minute scanning of the object may be made. At the receiver the photoelectric cell currents are superimposed upon the oscillating receiving arc, synchronization being obtained through the usual synchronizer system 76 in Fig. 4. Furthermore, the scanning screen of Fig. 7 is adaptable to a combination color and stereoscopic transmission, since the oblong electrode rails may be composed of or coated with various light tingeing materials causing the arc to project on the object various colors as it oscillates over them at the same time producing an image having a depth dimension at the receiver.

It is also to be noted that although the screens in the same system must be of similar configuration, it is not necessary that they be of the same physical dimensions. That is, a certain sized scanning screen may be used to transmit to a receiving screen of smaller or larger size permitting reduction or amplification of the received images. So long as the configuration of the screen and the time of arc propagation over the screen is maintained constant at the transmitter and the receiver, the size thereof is theoretically immaterial. A small scanning screen may transmit to a large scanning screen, the latter being used in theatres or auditoriums for reproduction of scenes for large audiences.

Although the invention has been described in its preferred embodiments, it is susceptible of many modifications, and is to be limited only by the scope of the appended claims.

What is claimed is:

1. A television scanning system comprising electrodes, means for polarizing said electrodes to form an arc therebetween, means for obtaining a magnetic field to propagate said arc along said electrodes, and means for scanning an object with light from said arc from different angles.

2. In a television scanning system comprising electrodes, means for polarizing said electrodes to form an arc therebetween, means for obtaining a magnetic field to propagate said arc along said electrodes, a plurality of photo-electric cells, and means for scanning an object alternately with light from said arc for transmission with alternate cells.

3. A television transmission system comprising electrodes, means for polarizing said electrodes to form an arc therebetween, means for obtaining a magnetic field to propagate said arc along said electrodes, means for scanning an object twice during one travel of said arc along said electrodes and means for successively transmitting said scannings.

4. A television scanning system comprising electrodes, means for polarizing said electrodes to form an arc therebetween, means for obtaining a magnetic field to propagate said arc along said electrodes, means for effectively scanning simultaneously said object from different angles and means for transmitting said views successively.

5. A television scanning system comprising electrodes, means for polarizing said electrodes to form an arc therebetween, means for obtaining a magnetic field to propagate said arc along said electrodes, said electrodes directing said arc in a pattern to scan an object in vertical line units, and means for causing said arc to scan said object at least twice during its propagation horizontally.

6. In a television system comprising electrodes, means for polarizing said electrodes to create an arc therebetween, an inductance for creating a magnetic field around said electrodes to propagate said arc therealong, a double pinhole camera, and means for adjusting the focus of said camera to direct light from said arc over an object in unit areas for permitting said arc to scan said object at least twice at any distance between said object and said electrodes.

7. In a television system, a plurality of photoelectric cells, means for rendering said cells operative alternately, a set of electrodes, means far initiating an arc therebetween, a magnetic field surrounding said electrodes for propagating said arc along said electrodes, and means for scanning an object with light from said arc when moving over certain portions of said electrodes for transmission by said cells in synchrony with the operativeness of said cells.

8. In a television system, a set of electrodes, means for polarizing said electrodes to form an arc therebetween, means for obtaining a magnetic field surrounding said electrodes to propagate said arc therealong, means for scanning an object with light from said arc from a plurality of positions, a second arc system, means for transforming said scannings into current vibrations corresponding thereto, means for transmitting said electric vibrations to said second arc system, and means for impressing said scannings upon said second screen to give a depth dimension to the image of said object.

9. In a television scanning system comprising electrodes, means for polarizing said electrodes to form an arc therebetween, means for obtaining a magnetic field to propagate said arc along said electrodes, means for scanning a plurality of views of an object with light projected from said arc along different portions of said electrodes, and means for successively detecting and transmitting said views, said detecting means including a plurality of photoelectric cells.

10. An electrodynamic arc electrode screen having anterior and posterior scanning portions, in different planes, means for polarizing said electrodes of said screen, means for obtaining a magnetic field sufficient to propagate said arc over both of said portions, and means for directing light from said screen over an object in unit areas.

11. An electrodynamic arc screen of definite dimensions, means for polarizing electrodes in said screen to form an arc therebetween, a field for driving said arc in said screen in one direction over said screen, a second field for driving said arc in a direction normal to said first direction, means for detecting light from said arc and for transforming said light into electrical currents, a second screen having different dimensions than said first screen, and means for transmitting said electrical currents to said second screen for modulating the arc on said second screen, and means for driving said second arc over said second screen in the same relative manner as said first arc.

12. In a television system, the combination of an electrode screen, means for polarizing said screen to create an arc between said electrodes, means for obtaining a magnetic field surrounding said electrodes for propagating said arc therealong, means for directing light from portions of said screen to an object, said means comprising a double opening camera, and means for transforming light from said object when scanned through one opening alternately with the light obtained from scanning said object through said second opening, means for transmitting the electrical currents of said scannings to a similar screen, means for impressing said currents on said second screen to form the images of said object in similar positions on said receiving screen, and means for permitting the observation of said images simultaneously.

13. In a television system, a pair of electrode rails, means for polarizing said rails to create an arc therebetween, a plurality of coils for providing a magnetic field around said electrodes, said coils producing quadrature fields for driving said arc in an oscillating manner along said electrodes, means for directing said light across an object in unit areas, means for transforming said light into electrical vibrations, means for transmitting said vibrations to a similar receiving arc screen, means for modulating said receiving screen arc with said image components in synchrony with said scanning arc to produce a depth dimension in said received image.

14. In a stereoscopic television system, a set of electrodes, means for polarizing said electrodes to create an arc therebetween, means for creating a magnetic field surrounding said electrodes to propagate said arc therealong, means for directing said light over unit areas of an object in vertical line sections when said arc passes over one portion of said electrodes, said means again directing light over said object in vertical sections when said arc travels over the remaining portion of said electrodes, and means for transforming said light variations into electrical currents.

15. In a television system, the combination of an electrode rail screen having two portions, means for polarizing said electrodes to create an arc therebetween, means for creating a magnetic field surrounding said electrodes for propagating said arc therealong, said arc traversing one portion of said screen in line units and said second portion of said screen in line units alternately, means for directing the light from said arc when in said first portion of said screen in unit areas over an entire object, said means also directing said light over said entire object in unit areas when in said second portion of said screen, a similar reproducing screen, means for transmitting electrical variations corresponding to light and shade densities of said object scanned to said second screen, means for synchronizing the arcs on said screens, and means for impressing the electrical currents corresponding to the light and shade densities of said object on the arc when in portions of the receiving screen corresponding to the position of the arc on the scanning screen.

16. In a television system, the combination of an electrode screen, means for polarizing said screen to create an arc between said electrodes, means for obtaining a magnetic field surrounding said electrodes for propagating said arc therealong, means for directing said light from said arc along vertical line units of an object and for causing said light to scan said object at least twice during one cycle of said arc over said electrodes, said means comprising a double opening camera intermediate said screen and said object, and means for varying the distance between openings of said camera to permit complete scanning of said object through each of said openings.

Witness my hand this 26 day of May, 1930, at Newark, county of Essex, State of New Jersey.

ALEXANDER McLEAN NICOLSON.